(12) United States Patent
Snowden et al.

(10) Patent No.: US 7,781,353 B2
(45) Date of Patent: Aug. 24, 2010

(54) EXTRUDED THERMOPLASTIC ARTICLES WITH ENHANCED SURFACE SEGREGATION OF INTERNAL MELT ADDITIVE

(75) Inventors: Hue Scott Snowden, Woodstock, GA (US); Michael David Powers, Canton, GA (US); Roger Bradshaw Quincy, III, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 12/420,373

(22) Filed: Apr. 8, 2009

(65) Prior Publication Data
US 2009/0197039 A1    Aug. 6, 2009

Related U.S. Application Data

(63) Continuation of application No. 10/954,504, filed on Sep. 30, 2004, now abandoned, which is a continuation-in-part of application No. 10/881,520, filed on Jun. 30, 2004, now Pat. No. 7,285,595.

(51) Int. Cl.
*B32B 27/12* (2006.01)
(52) U.S. Cl. .................. 442/394; 442/397; 442/398; 428/421
(58) Field of Classification Search ............ 442/394, 442/397, 398; 428/421
See application file for complete search history.

(56) References Cited

U.S. PATENT DOCUMENTS

| | | |
|---|---|---|
| 3,692,618 A | 9/1972 | Dorschner et al. |
| 3,730,918 A | 5/1973 | Teti et al. |
| 3,770,856 A | 11/1973 | Ueke et al. |
| 3,802,817 A | 4/1974 | Matsuki et al. |

(Continued)

FOREIGN PATENT DOCUMENTS

EP    1207182 A1    5/2002

(Continued)

OTHER PUBLICATIONS

Rao, Nandakumar S., et al., *Textile Finishes and Fluorosurfactants.* Organofluorine Chemistry (Principles and Commercial Applications), 1994 Plenum Press, NY, ISBN 0-306-44610-3, pp. 321-338.

(Continued)

*Primary Examiner*—Norca L Torres-Velazquez
(74) *Attorney, Agent, or Firm*—Dority & Manning, P.A.

(57) ABSTRACT

Disclosed herein are extruded articles such as, for example, fibers and films, containing thermoplastic polymeric compositions having a copolymeric major component and a melt processable additive treatment, wherein the melt processable additives have enhanced segregation to or expression at the surface of the article, thereby improving the effect of the desired characteristic of the additive treatment. Also disclosed are multicomponent extruded thermoplastic articles having two or more distinct components arranged in a specific geometric arrangement, wherein the thermoplastic polymeric composition of at least one geometric component includes a copolymeric major component and a melt processable additive treatment. Also disclosed are web materials including the extruded articles. Such extruded articles and multicomponent extruded thermoplastic articles are useful in a wide range of limited use and disposable products such as, for example, personal care products, mortuary and veterinary products, protective wear garments, and medical care garments and products.

17 Claims, 2 Drawing Sheets

U.S. PATENT DOCUMENTS

| | | |
|---|---|---|
| 3,849,241 A | 11/1974 | Butin et al. |
| 3,855,046 A | 12/1974 | Hansen et al. |
| 3,902,957 A | 9/1975 | Kozlowski |
| 3,920,508 A | 11/1975 | Yonemori |
| 3,973,068 A | 8/1976 | Weber et al. |
| 4,041,203 A | 8/1977 | Brock et al. |
| 4,070,218 A | 1/1978 | Weber et al. |
| 4,260,565 A | 4/1981 | D'Amico et al. |
| 4,307,143 A | 12/1981 | Meitner |
| 4,340,563 A | 7/1982 | Appel et al. |
| 4,374,888 A | 2/1983 | Bornslaeger |
| 4,451,589 A | 5/1984 | Morman et al. |
| 4,488,928 A | 12/1984 | Ali Khan et al. |
| 4,707,398 A | 11/1987 | Boggs |
| 4,855,360 A | 8/1989 | Duchesne et al. |
| 4,857,251 A | 8/1989 | Nohr et al. |
| 4,863,983 A | 9/1989 | Johnson et al. |
| 4,920,168 A | 4/1990 | Nohr et al. |
| 4,923,914 A | 5/1990 | Nohr et al. |
| 5,025,052 A | 6/1991 | Crater et al. |
| 5,057,262 A | 10/1991 | Nohr et al. |
| 5,064,802 A | 11/1991 | Stevens et al. |
| 5,108,820 A | 4/1992 | Kaneko et al. |
| 5,120,888 A | 6/1992 | Nohr et al. |
| 5,145,727 A | 9/1992 | Potts et al. |
| 5,153,157 A | 10/1992 | Hlatky et al. |
| 5,169,706 A | 12/1992 | Collier, IV et al. |
| 5,178,931 A | 1/1993 | Perkins et al. |
| 5,204,394 A | 4/1993 | Gosens et al. |
| 5,204,429 A | 4/1993 | Kaminsky et al. |
| 5,213,881 A | 5/1993 | Timmons et al. |
| 5,260,360 A | 11/1993 | Mrozinski et al. |
| 5,272,236 A | 12/1993 | Lai et al. |
| 5,278,272 A | 1/1994 | Lai et al. |
| 5,283,023 A | 2/1994 | Nohr et al. |
| 5,294,654 A | 3/1994 | Hellstern-Burnell et al. |
| 5,300,167 A | 4/1994 | Nohr et al. |
| 5,332,613 A | 7/1994 | Taylor et al. |
| 5,336,552 A | 8/1994 | Strack et al. |
| 5,336,707 A | 8/1994 | Nohr et al. |
| 5,374,696 A | 12/1994 | Rosen et al. |
| 5,382,400 A | 1/1995 | Pike et al. |
| 5,451,450 A | 9/1995 | Elderly et al. |
| 5,459,188 A | 10/1995 | Sargent et al. |
| 5,482,765 A | 1/1996 | Bradley et al. |
| 5,539,056 A | 7/1996 | Yang et al. |
| 5,539,124 A | 7/1996 | Etherton et al. |
| 5,554,775 A | 9/1996 | Krishnamurti et al. |
| 5,567,372 A | 10/1996 | Nohr et al. |
| 5,589,258 A | 12/1996 | Maddern et al. |
| 5,596,052 A | 1/1997 | Resconi et al. |
| 5,597,647 A | 1/1997 | Powers |
| 5,618,622 A | 4/1997 | Gillberg-Laforce et al. |
| 5,643,981 A | 7/1997 | Yang et al. |
| 5,681,963 A | 10/1997 | Liss |
| 5,690,949 A | 11/1997 | Weimer et al. |
| 5,696,191 A | 12/1997 | Nohr et al. |
| 5,706,804 A | 1/1998 | Baumann et al. |
| 5,708,084 A | 1/1998 | Hauenstein et al. |
| 5,736,465 A | 4/1998 | Stahl et al. |
| 5,738,111 A | 4/1998 | Weimer et al. |
| 5,789,491 A | 8/1998 | Liss et al. |
| 5,798,402 A | 8/1998 | Fitzgerald et al. |
| 5,804,625 A | 9/1998 | Temperante et al. |
| 5,853,641 A | 12/1998 | Nohr et al. |
| 5,858,515 A | 1/1999 | Stokes et al. |
| 5,885,909 A | 3/1999 | Rudisill et al. |
| 5,898,046 A | 4/1999 | Raiford et al. |
| 5,932,497 A | 8/1999 | Morman et al. |
| 5,977,390 A | 11/1999 | Raiford et al. |
| 5,981,614 A | 11/1999 | Adiletta |
| 5,997,981 A | 12/1999 | McCormack et al. |
| 6,015,764 A | 1/2000 | McCormack et al. |
| 6,037,281 A | 3/2000 | Mathis et al. |
| 6,063,474 A | 5/2000 | Raiford et al. |
| 6,111,163 A | 8/2000 | McCormack et al. |
| 6,114,024 A | 9/2000 | Forte |
| 6,114,419 A | 9/2000 | Liss et al. |
| 6,127,480 A | 10/2000 | Dominguez et al. |
| 6,146,574 A | 11/2000 | Henkee et al. |
| 6,166,161 A | 12/2000 | Mullins et al. |
| 6,203,889 B1 | 3/2001 | Quincy, III et al. |
| 6,300,258 B1 | 10/2001 | Stano et al. |
| 6,309,736 B1 | 10/2001 | McCormack et al. |
| 6,350,399 B1 | 2/2002 | Cook et al. |
| 6,353,149 B1 | 3/2002 | Stone |
| 6,365,769 B1 | 4/2002 | Behr et al. |
| 6,399,700 B2 | 6/2002 | Mayes et al. |
| 6,413,621 B1 | 7/2002 | Mayes et al. |
| 6,461,133 B1 | 10/2002 | Lake et al. |
| 6,461,457 B1 | 10/2002 | Taylor et al. |
| 6,474,967 B1 | 11/2002 | Haynes et al. |
| 6,476,135 B1 | 11/2002 | Bugada et al. |
| 6,482,911 B1 | 11/2002 | Jariwala et al. |
| 6,586,522 B1 | 7/2003 | Jariwala et al. |
| 6,593,416 B2 | 7/2003 | Grootaert et al. |
| 6,608,129 B1 | 8/2003 | Koloski et al. |
| 6,613,268 B2 | 9/2003 | Haynes et al. |
| 6,613,704 B1 | 9/2003 | Arnold et al. |
| 6,613,860 B1 | 9/2003 | Dams et al. |
| 6,630,087 B1 | 10/2003 | Hancock et al. |
| 7,285,595 B2 | 10/2007 | Quincy, III et al. |
| 7,381,666 B2 * | 6/2008 | Little et al. ................. 442/394 |
| 2002/0169429 A1 | 11/2002 | Li et al. |
| 2003/0162903 A1 | 8/2003 | Day |
| 2005/0038208 A1 * | 2/2005 | Dahn et al. ................... 526/73 |

FOREIGN PATENT DOCUMENTS

| | | |
|---|---|---|
| WO | WO 0006817 A1 | 2/2000 |
| WO | WO 0192418 A2 | 12/2001 |
| WO | WO 03104310 A2 | 12/2003 |

OTHER PUBLICATIONS

Phillips, Roger W., et al., *Application of ESCA and Contact Angle Measurements to Studies of Surface Activity in a Fluoropolymer Mixture*, Journal of Colloid and Interface Science, vol. 56, No. 2, Aug. 1976, pp. 251-254.

* cited by examiner

EXTRUDED THERMOPLASTIC ARTICLES WITH ENHANCED SURFACE SEGREGATION OF INTERNAL MELT ADDITIVE

The present application claims priority to and is a continuation of U.S. patent application Ser. No. 10/954,504 filed on Sep. 30, 2004 (now abandoned), which claims priority to and is a continuation-in-part of U.S. patent application Ser. No. 10/881,520 filed on Jun. 30, 2004 (now U.S. Pat. No. 7,285,595), both of which are incorporated by reference herein.

BACKGROUND OF THE INVENTION

Many of the personal care products, mortuary and veterinary products, protective wear garments, and medical care garments and products in use today are partially or wholly constructed of materials such as thermoplastic film materials and thermoplastic fibrous nonwoven materials. Examples of such products include, but are not limited to, medical and health care products such as surgical drapes, gowns and bandages, protective workwear garments such as coveralls and lab coats, and infant, child and adult personal care absorbent products such as diapers, training pants, disposable swimwear, incontinence garments and pads, sanitary napkins, wipes and the like. For these applications thermoplastic nonwoven fibrous webs and thermoplastic films provide tactile, comfort and aesthetic properties which can approach or even exceed those of products or garments made from traditional woven or knitted cloth materials.

Other nonwoven or film material properties may be desirable depending on end-use applications. For example, certain end-use applications such as liners for diapers and incontinence products and feminine hygiene products call for nonwovens which are highly wettable and will quickly allow liquids to pass through them. On the other hand, for applications such as protective fabrics, for instance medical products such as surgical fabrics for drapes and gowns, and fabrics for other protective garments, barrier properties are highly desirable. Further, surgical fabrics for drapes and gowns should have a high degree of repellency to low surface tension liquids such as alcohols, aldehydes, ketones and hydrophilic liquids, such as those containing surfactants, in order to more fully protect medical personnel. Repellency to low surface tension liquids is also highly desirable for protective garment fabrics such as lab coats or industrial protective workwear, for example.

In order to provide desired functional properties or characteristics to products, melt-processable additive treatments are known which may be introduced into a thermoplastic polymeric melt and thus be extruded along with the thermoplastic polymer during the process of forming films and fibers. However, the main desired function of many such melt-processable additives is to produce the desired characteristic at the surface of the films or fibers, and many melt-processable additives are relatively very expensive compared to the base polymers conventionally used as fiber- or film-forming thermoplastic resins. Because the melt-processable additive is distributed throughout the thermoplastic melt during the mixing, melting and extruding process, much of the melt-processable additive is essentially wasted, trapped deep within the fiber or film, distant from the surface of the fiber or film where it can act to fulfill its desired function.

Consequently, there remains a need for thermoplastic extruded articles having a greater or enhanced expression or segregation of the melt processable additive treatment at the surface of the extruded article.

SUMMARY OF THE INVENTION

The invention provides for extruded thermoplastic articles having enhanced or improved surface segregation or surface migration of a melt processable additive treatment. In one embodiment, the extruded thermoplastic articles may be such as films, foams, staple fibers, meltblown fibers and meltblown webs, where the extruded thermoplastic article includes a thermoplastic polymeric composition and the thermoplastic polymeric composition includes a minor component melt processable additive treatment and a major component thermoplastic copolymer. The thermoplastic polymeric composition may further include a second thermoplastic polymer or copolymer as a second minor component. In desirable embodiments, the major component copolymer may be a polyolefin copolymer, and/or the second polymer or copolymer may be a polyolefin polymer or copolymer. The melt processable additive treatment may desirably be a low surface tension fluids repellency additive.

In another embodiment is provided a multicomponent extruded thermoplastic article, such as, for example, multicomponent spunbond or multicomponent meltblown fibers, or multilayer films, which includes at least a first component including a first thermoplastic polymeric composition, and a second component including a second thermoplastic polymeric composition, where at least the first thermoplastic polymeric composition includes a minor component melt processable additive treatment and a major component thermoplastic copolymer. The major component thermoplastic copolymer of the first thermoplastic polymeric composition may desirably be a polyolefin copolymer, and the second thermoplastic polymeric composition may desirably include a polyolefin homopolymer or copolymer. The first thermoplastic polymeric composition may desirably be a blend of the minor component melt processable additive treatment, the major component thermoplastic copolymer, and at least one additional thermoplastic polymer or copolymer.

DETAILED DESCRIPTION OF THE INVENTION

Definitions

Figure 1:
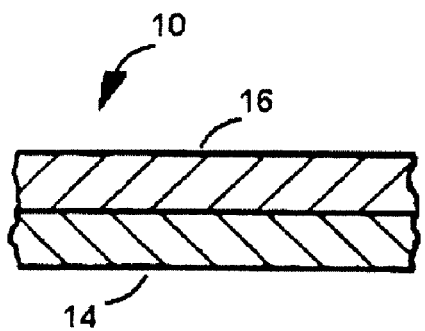
FIG. 1 is a schematic illustration of an embodiment of a protective material which may be formed utilizing the extruded thermoplastic articles of the present invention.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein the term "monocomponent" filament refers to a filament formed from one or more extruders using only one polymeric extrudate. This is not meant to exclude filaments formed from one polymer to which small amounts of additives have been added for color, anti-static properties, lubrication, hydrophilicity, etc.

As used herein the term "multicomponent filaments" refers to filaments that have been formed from at least two component polymers, or the same polymer with different properties or additives, extruded from separate extruders but spun together to form one filament. Multicomponent filaments are also sometimes referred to as conjugate filaments or bicomponent filaments, although more than two components may be used. The polymers are arranged in substantially constantly positioned distinct zones across the cross-section of the multicomponent filaments and extend continuously along the length of the multicomponent filaments. The configuration of such a multicomponent filament may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section filament, or other configurations. Multicomponent filaments are taught in U.S. Pat. No. 5,108,820 to Kaneko et al. and U.S. Pat. No. 5,336,552 to Strack et al. Conjugate fibers are also taught in U.S. Pat. No. 5,382,400 to Pike et al. and may be used to produced crimp in the fibers by using the differential rates of expansion and contraction of the two (or more) polymers. For two component filaments, the polymers may be present in ratios of 75/25, 50/50, 25/75 or any other desired ratios. In addition, any given component of a multicomponent filament may desirably comprise two or more polymers as a multiconstituent blend component.

As used herein the terms "biconstituent filament" or "multiconstituent filament" refer to a filament formed from at least two polymers, or the same polymer with different properties or additives, extruded from the same extruder as a blend. Multiconstituent filaments do not have the polymer components arranged in substantially constantly positioned distinct zones across the cross-section of the multicomponent filaments; the polymer components may form fibrils or protofibrils that start and end at random.

As used herein the terms "nonwoven web" or "nonwoven fabric" refer to a web having a structure of individual filaments or filaments that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the filament diameters useful are usually expressed in microns, (Note that to convert from osy to gsm, multiply osy by 33.91).

The terms "spunbond" or "spunbond fiber" or "spunbond fiber web" refer to a nonwoven fiber or filament material of small diameter filaments that are formed by extruding molten thermoplastic polymer as filaments from a plurality of capillaries of a spinneret. The extruded filaments are cooled while being drawn by an educative or other well known drawing mechanism. The drawn filaments are deposited or laid onto a forming surface in a generally random manner to form a loosely entangled filament web, and then the laid filament web is subjected to a bonding process to impart physical integrity and dimensional stability. The production of spunbond fabrics is disclosed, for example, in U.S. Pat. Nos. 4,340,563 to Appel et al., 3,692,618 to Dorschner et al., and 3,802,817 to Matsuki et al. Typically, spunbond fibers or filaments have a weight-per-unit-length in excess of about 1 denier and up to about 6 denier or higher, although both finer and heavier spunbond filaments can be produced. In terms of filament diameter, spunbond filaments often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin, U.S. Pat. No. 4,307,143 to Meitner et al., and U.S. Pat. No. 4,707,398 to Wisneski et al., all incorporated herein by reference in their entireties. Meltblown fibers may be continuous or discontinuous, are often smaller than 10 microns in average diameter and are frequently smaller than 7 or even 5 microns in average diameter, and are generally tacky when deposited onto a collecting surface.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that is combed or otherwise treated to provide a web of generally uniform basis weight.

As used herein, "thermal point bonding" involves passing a fabric or web of fibers or other sheet layer material to be bonded between a heated calendar roll and an anvil roll. The calendar roll is usually, though not always, patterned on its surface in some way so that the entire fabric is not bonded across its entire surface. As a result, various patterns for calendar rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a high density diamond or "HDD pattern", which comprises point bonds having about 460 pins per square inch (about 71 pins per square centimeter) for a bond area of about 15% to about 23% and a wire weave pattern looking as the name suggests, e.g. like a window screen. Typically, the percent bonding area varies from around 10% to around 30% or more of the area of the fabric laminate web. Another known thermal calendering bonding method is the "pattern unbonded" or "point unbonded" or "PUB" bonding as taught in U.S. Pat. No. 5,858,515 to Stokes et al., wherein continuous bonded areas define a plurality of discrete unbonded areas. Thermal bonding (point bonding or point-unbonding) imparts integrity to individual layers by bonding fibers within the layer and/or for laminates of multiple layers, such thermal bonding holds the layers together to form a cohesive laminate material.

The present invention provides extrudable articles comprising thermoplastic polymeric compositions which enhance the surface segregation or migration to surface of migratory melt additives such as melt processable additive treatments. The thermoplastic polymeric composition comprises as a minor component at least one melt processable additive treatment and as a major component at least one thermoplastic copolymer.

By "major" component what is meant is that the at least one thermoplastic copolymer will comprise more than 50 percent by weight of the thermoplastic polymeric composition, and by analogy, a "minor" component is one which comprises from a positive amount up to less than 50 percent by weight of the thermoplastic polymeric composition. Generally, a melt processable additive treatment will be present in the thermoplastic polymeric composition in an amount from greater than 0% by weight up to about 45%, and more particularly up to about 25%, and still more particularly up to about 10% by weight of the thermoplastic polymeric composition. For many applications, a melt processable additive treatment will be present in an amount from greater than 0% by weight up to about 5%, and more desirably in an amount from about 0.1% to about 4%, and still more desirably in an amount from about 0.25% to about 2.5% by weight of the thermoplastic polymeric composition. Generally speaking, while the thermoplastic polymeric composition will have only one major component, it may have one or more minor components in addition to the melt processable additive treatment for which surface migration is desired.

The extrudable articles may be formed from thermoplastic polymeric compositions which are melt extruded in the form of various articles such as for example blow molded or injection molded articles. The extruded articles, when intended for use in personal care products, protective wear garments, and medical products and garments, are especially useful in the form of various films and various melt spun fibers and nonwoven webs as are known in the art. The extruded articles in the form of films or fibers may also desirably be utilized in textile fabrics, carpeting, and the like.

Because the melt processable additive treatment has enhanced migration to the surface of the extruded article, the characteristic desired to be imparted to the extruded article may be expressed in increased measure. As an alternative, the desired characteristic may be imparted to the extruded article in a normal measure, but at a reduction in the amount of the additive normally required to produce the desired characteristic at such measure.

The particular additive or additives to be included in the extrudable polymeric composition may be selected to impart or improve specific surface characteristics of the extruded article. A variety of additives or chemical compounds are known to be utilized to impart or improve various surface properties including, for example, absorbency, hydrophilicity or wettability, anti-static properties, anti-microbial properties, anti-fungal properties, repellency to low surface tension fluids (such as alcohols, aldehydes, ketones, water and hydrophilic liquids, such as those containing surfactants) and so forth.

To impart or increase hydrophilicity or wettability to polymeric articles, melt processable hydrophilizing additives which may be used include, for example, ethoxylated hydrocarbon surfactants, ethoxylated silicone surfactants, ethoxylated fluorocarbon surfactants and so forth. Examples of melt additives which may be used to increase the hydrophilicity of melt-extruded thermoplastic polymeric films and fibers are disclosed in U.S. Pat. Nos. 3,973,068 and 4,070,218 to Weber et al. and U.S. Pat. No. 5,696,191 to Nohr et al., all incorporated herein by reference in their entireties. Exemplary melt processable additive treatments to increase hydrophilicity include MASIL® SF-19, an ethoxylated siloxane available from The Lubrizol Corporation of Wickliffe, Ohio; MAPEG 600 DO, a poly(ethylene glycol) dioleate available from BASF Corporation of Mount Olive, N.J.; CHROMASIST 188-A, also a poly(ethylene glycol) dioleate, available from Cognis Corporation of Ambler, Pa.; and Siltech MFF-184-SW, an ethoxylated siloxane surfactant from Siltech Corporation of Toronto, Canada. Other exemplary ethoxylated siloxane surfactants are described in U.S. Pat. No. 6,300,258 to Stano and Quincy, incorporated herein by reference in its entirety.

To improve liquid barrier properties, chemical compositions suitable for use in melt-extrusion processes to impart or improve low surface tension fluids repellency include, but are not limited to, fluorochemicals. Exemplary melt processable additive treatments for repellency to low surface tension fluids include those available from E. I. du Pont de Nemours and Company of Wilmington, Del. under the trade name ZONYL® fluorochemicals, and those available from Daikin America, Inc. of Orangeburg, N.Y., under the trade name of UNIDYNE. Various additives suitable for imparting low surface tension fluid repellency to thermoplastic polymeric articles are disclosed in U.S. Pat. No. 5,145,727 to Potts et al., U.S. Pat. No. 5,178,931 to Perkins et al., U.S. Pat. No. 4,855,360 to Duchesne et al., U.S. Pat. No. 4,863,983 to Johnson et al., U.S. Pat. No. 5,798,402 to Fitzgerald et al., U.S. Pat. No. 5,459,188 to Sargent et al. and U.S. Pat. No. 5,025,052 to Crater et al., all incorporated herein by reference in their entireties.

As stated, the extruded thermoplastic articles may desirably be in the form of fibers, such as meltblown fibers or spunbond fibers, or in the form of various thermoplastic films. Processes for the formation of meltblown fibers and meltblown fiber nonwoven webs are well known in the art and will not be described in detail herein. Briefly, meltblown is formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin, U.S. Pat. No. 4,307,143 to Meitner et al., and U.S. Pat. No. 4,707,398 to Wisneski et al., all incorporated herein by reference in their entireties. Meltblown fiber layers are very useful for providing a layer having a certain resistance to the passage of liquids, and therefore acting as a liquid barrier layer or partial liquid barrier layer, while still allowing gases and vapors, such as air and water vapor to pass through and thereby improving skin comfort. In this way a meltblown fiber layer may be utilized to provide a breathable liquid barrier layer.

Where the extruded article is desired to be in the form of meltblown fibers, it is highly desirable to utilize a polymer having a high melt flow rate. Exemplary high melt flow rate polymers include those provided by adding a prodegradant such as a peroxide to conventionally produced polymers such as those made by Ziegler-Natta catalysts in order to partially degrade the polymer to increase the melt flow rate and/or narrow the molecular weight distribution. Peroxide addition to polymer pellets is described in U.S. Pat. No. 4,451,589 to Morman et al. and improved barrier microfiber nonwoven webs which incorporate peroxides in the polymer are disclosed in U.S. Pat. No. 5,213,881 to Timmons et al., both incorporated herein by reference in their entireties.

In addition to the peroxidated or peroxide-degraded polymers described above, high melt flow rate polymers are known which as-polymerized comprise polymers having a narrow molecular weight distribution and/or low polydispersity (relative to conventional olefin polymers such as those made by Ziegler-Natta catalysts) and include those catalyzed by "metallocene catalysts", "single-site catalysts", "constrained geometry catalysts" and/or other like catalysts. These types of polymers are also highly suited to producing extruded articles comprising meltblown type fibers. Examples of such catalysts and/or olefin polymers made therefrom are described in, by way of example only, U.S. Pat. No. 5,153,157 to Canich, U.S. Pat. No. 5,064,802 to Stevens et al., U.S. Pat. No. 5,374,696 to Rosen et al., U.S. Pat. No. 5,451,450 to Elderly et al., U.S. Pat. No. 5,204,429 to Kaminsky et al., U.S. Pat. No. 5,539,124 to Etherton et al., U.S. Pat. Nos. 5,278,272 and 5,272,236, both to Lai et al., U.S. Pat. No. 5,554,775 to Krishnamurti et al. and U.S. Pat. No. 5,539,124 to Etherton et al. Exemplary polymers having a high melt flow rate, narrow molecular weight distribution and low polydispersity are disclosed in U.S. Pat. No. 5,736,465 to Stahl et al. and are available from the ExxonMobil Chemical Company of Houston, Tex. under the trade name ACHIEVE.

Processes for the formation of spunbond fibers and spunbond nonwoven webs are well known in the art and also will not be described in detail herein. Briefly, spunbond webs are formed by extruding molten thermoplastic polymer as filaments from a plurality of capillaries of a spinneret. The extruded filaments are cooled or "quenched" while being drawn by an educative gun or pneumatic slot draw unit or other well known drawing mechanism. The drawn filaments are deposited or laid onto a foraminous forming surface in a generally random, isotropic manner to form a loosely entangled fiber web, and then the laid fiber web is subjected to a bonding process to impart physical integrity and dimensional stability. The production of spunbond fabrics is disclosed, for example, in U.S. Pat. No. 4,340,563 to Appel et al., U.S. Pat. No. 3,802,817 to Matsuki et al. and U.S. Pat. No. 3,692,618 to Dorschner et al., all incorporated herein by reference in their entireties. Typically, spunbond fibers have a weight-per-unit-length in excess of 2 denier and up to about 6 denier or higher, although finer spunbond fibers are known and can be produced. In addition, processes for the formation of spunbond-meltblown laminate materials and spunbond-meltblown-spunbond are disclosed in disclosed in U.S. Pat. No. 4,041,203 to Brock et al., U.S. Pat. No. 5,169,706 to Collier, et al. and U.S. Pat. No. 4,374,888 to Bornslaeger, all incorporated herein by reference in their entireties.

Various thermoplastic films and processes for forming them are known in the art. For example, microporous breathable films contain a filler material, such as for example calcium carbonate particles, in an amount usually from about 30 percent to 70 percent by weight of the film. The filler-containing film (or "filled film") is then stretched or oriented to open micro-voids around the filler particles in the film, which micro-voids allow for the passage of air and water vapor through the film. Exemplary breathable films and film-nonwoven laminate materials are described in, for example, U.S. Pat. No. 6,114,024 to Forte, U.S. Pat. No. 6,309,736 to McCormack et al, and U.S. Pat. No. 6,037,281 to Mathis et al., all incorporated herein by reference in their entireties. In addition, breathable microporous elastic films containing fillers are described in, for example, U.S. Pat. Nos. 6,015,764 and 6,111,163 to McCormack and Haffner, U.S. Pat. No. 5,932,497 to Morman and Milicevic, and in U.S. Pat. No. 6,461,457 to Taylor and Martin; all incorporated herein by reference in their entireties.

As stated, the extruded article may desirably be a multicomponent extruded thermoplastic article and comprise multicomponent fibers. In this regard, it may be possible to reduce the amount of internal additive required still further by either using the additive in less than all of the components, or by using the additive in all components but using decreased concentrations in one or more of the components of the multicomponent extruded thermoplastic article. Bicomponent and multicomponent fiber production processes are known in the art. For example, U.S. Pat. No. 5,382,400 to Pike et al., incorporated herein by reference in its entirety, discloses a suitable process for producing multicomponent fibers and webs thereof. Also, multicomponent microfibers such as bicomponent or multicomponent meltblown microfibers are known in the art and may desirably be utilized. Multicomponent fibers in meltblowing production processes are described in U.S. Pat. No. 6,461,133 to Lake et al. and U.S. Pat. No. 6,474,967 to Haynes et al., both incorporated herein by reference in their entireties.

The geometric configuration or arrangement of the components of such multicomponent fibers may be, for example, a concentric or eccentric sheath-core arrangement wherein one polymer is surrounded by another, or may be in a side by side arrangement, or an "islands-in-the-sea" arrangement, or arranged as pie-wedge shapes, hollow pie-wedges, or as stripes on a round, oval or rectangular cross-section filament, or other configurations. However, at least one surface-facing geometric component should desirably comprise a thermoplastic polymeric composition including a melt processable additive treatment. That is, because it is necessary for the melt processable additive treatment to be able to reach the surface of the extruded article in order to be effective, if the only melt processable additive-containing component of the multicomponent extruded article is a non-surface facing component such as a core component in a sheath-core configuration, or island components in an islands-in-the-sea arrangement, then the effects of the melt processable additive would be decreased rather than enhanced.

As stated, a multicomponent extruded thermoplastic article may also desirably be a multilayer film. A multilayer film may be constructed to have one or more core components and one or more "skin" or thin outer layer components. Where the extruded article is a multilayer film it may be desirable to have the skin or outer layer component comprise the thermoplastic polymeric composition having the melt processable additive, in order to reduce the overall amount of melt processable additive required to provide the desired properties to the film. Alternatively, where multilayer film is to be stretched-thinned film or a filled breathable film stretched to impart breathability, it may be desirable to have the melt processable additive-containing thermoplastic polymeric composition as the core component of the multilayer film. Exemplary multilayer films such as are disclosed in U.S. Pat. Nos. 5,997,981 and 6,309,736 to McCormack et al., U.S. Pat.

No. 6,114,024 to Forte and U.S. Pat. No. 6,037,281 to Mathis et al., all incorporated herein by reference in their entireties, may be useful.

In order to effectively incorporate the melt processable additive into the thermoplastic polymeric composition, melt additives may be mixed, prior to extrusion, directly with a thermoplastic polymer or polymers to be extruded and thereafter melt-processing the additive-polymer mixture to produce the film or fibers of the extruded article. Where multi-component fibers or multilayer films are desired, the additive-polymer mixture may desirably be used in one or more of the components of the multicomponent fiber or in one or more of the layers of the multilayer film. Alternatively, for ease of incorporating the melt additive, the melt additive may be compounded with a base of one or more polymers. For example, a melt additive may be compounded into an additive-polymer compound "masterbatch" or "concentrate" at, for example, a 20 percent by weight loading level of the additive. Then, during the production of the film and/or fibers of the extruded article, if the 20 percent additive-polymer compound concentrate is added to the other virgin polymer or polymers to be extruded at a rate of 5 kilograms of additive-polymer compound to 95 kilograms of virgin polymer, the resulting film and/or fibers of the extruded article will contain 1 percent by weight of the melt additive.

Polymers known to be generally suitable for melt extrusion of fibers and films include polyolefins, polyesters, polyamides, polycarbonates and copolymers and blends thereof. Suitable polyolefins include polypropylene, e.g., isotactic polypropylene, syndiotactic polypropylene, blends of isotactic polypropylene and atactic polypropylene; polyethylene, e.g., high density polyethylene, medium density polyethylene, low density polyethylene and linear low density polyethylene; polybutylene, e.g., poly(1-butene) and poly(2-butene); polypentene, e.g., poly(1-pentene) and poly(2-pentene); poly (3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, poly-butylene terephthalate, polytetramethylene terephthalate, polycyclohexylene-1,4-dimethylene terephthalate, and isophthalate copolymers thereof, as well as blends thereof. Selection of polymers for fibers and/or films is guided by end-use need, economics, and processability. The list of suitable polymers herein is not exhaustive and other polymers known to one of ordinary skill in the art may be employed.

More specifically with respect to the melt processable additive-containing thermoplastic polymeric composition, the major component of this thermoplastic polymeric composition by weight should be a copolymer. The term copolymer is meant to include polymers comprising more than one type of monomer and does not exclude terpolymers. Suitable copolymers include olefinic copolymers, ethylene vinyl acetate copolymers, propylene vinyl acetate copolymers, styrene-poly(ethylene-alpha-olefin) elastic block copolymers, polyurethanes, A-B block copolymers where A is formed of poly(vinyl arene) moiety such as polystyrene and B is an elastomeric midblock such as a conjugated diene or lower alkene, polyethers, polyether esters, polyacrylates, ethylene alkyl acrylates, polyisobutylene, polybutadiene, isobutylene-isoprene copolymers, and combinations of any of the foregoing.

Polyolefin copolymers are highly suitable and are desirably used as the major component of the melt processable additive-containing thermoplastic polymeric composition. Examples of polyolefin copolymers include copolymers and terpolymers of ethylene, propylene or butene with another $C_2$-$C_{20}$ alpha-olefin, and random copolymers of polyolefins. Copolymers of ethylene and propylene with another alpha-olefin are preferred major components because of their relative inexpense and relative ease of melt-processing into extruded articles, compared to, for example, copolymers of butene with another alpha-olefin. Particularly preferred examples of copolymers for the major component are propylene copolymers having from about from about 90 weight percent to about 99.5 weight percent propylene and about 0.5 weight percent to about 10 weight percent of a co-monomer such as ethylene or a $C_4$-$C_{20}$ alpha olefin co-monomer. More particularly, such propylene copolymers may desirably have from about from about 95 weight percent to about 99 weight percent propylene and about 1 weight percent to about 5 weight percent of a co-monomer such as ethylene or a $C_4$-$C_{20}$ alpha olefin co-monomer. Commercially available random propylene copolymers include a random copolymer of propylene having approximately 3 percent ethylene which is designated 6D43 and is available from Basell, USA, Inc. of Wilmington, Del.

In addition, where the major component is a copolymer or random copolymer of propylene as discussed above, for the purposes of melt compatibility it is highly desirable for substantially the remainder of the composition (except for the melt additive minor component) to comprise minor components which are also propylene polymers or copolymers. However, this is not meant to say that small amounts of other additives such as pigments/colorants and the like may not be present. As a specific example, where the thermoplastic composition includes by weight 75 percent of a random copolymer of propylene (the major component), 1 weight percent of a melt processable additive treatment for which surface migration is desired, and 1 weight percent of a pigment, it is desirable that the remaining 23 weight percent of the thermoplastic composition comprise one or more minor components which are also propylene polymers or copolymers.

In addition, it may be desirable that one or more of the polymers used is an elastomeric polymer. Such an elastic polymer may be used either as an additional or minor component polymer in the melt processable additive-containing thermoplastic polymeric composition, or in a second component's thermoplastic polymeric composition (where a multi-component extruded article is to be produced). Many elastomeric polymers are known to be suitable for forming fibers, foams and films. Elastic polymers useful may be any suitable elastomeric fiber or film forming resin including, for example, elastic polyesters, elastic polyurethanes, elastic polyamides, elastic copolymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and where B is an elastomeric polymer midblock such as a conjugated diene or a lower alkene polymer such as for example polystyrene-poly (ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly(ethylene-propylene) or SEPSEP block copolymer. These A-B-A' and A-B-A-B copolymers are available in several different formulations from Kraton Polymers, LLC of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from the ExxonMobil Chemical Company of Houston, Tex., as well as blends.

As mentioned, to provide effective enhancement of desired properties, the melt processable additive treatment should desirably migrate to the surface of the extruded article so that more of the additive treatment will be available at the surface to provide these desired properties. It has been found that a thermoplastic polymeric composition comprising a melt processable additive treatment and having a relatively high level, that is, a majority by weight, of one or more copolymers provides good migration or segregation of the melt additive to the surface of the extruded article. In order to provide enhanced surface segregation of the melt processable additive, therefore, the melt processable additive is added to the extruded article as a minor component of a thermoplastic polymeric composition having as its major component a copolymer.

While not wishing to be bound by theory, we believe that having a copolymer, rather than a homopolymer, as a major component of the melt processable additive-containing thermoplastic polymeric composition assists migration of the additive by delaying the crystallization rate of the thermoplastic polymeric composition following its extrusion as an extruded article. Where the thermoplastic polymeric composition comprises an additional minor component polymer, whether a homopolymer or copolymer, we believe the copolymer major component also acts as an agent to slow the crystallization rate of the additional minor component polymer. In either case, with a slower crystallization rate we believe more of the melt processable additive treatment is capable of migrating to the surface of the extruded article, and/or that the melt processable additive can migrate in a more rapid fashion, thus giving the extruded article the desired functional surface properties of the melt processable additive more quickly.

EXAMPLES

Comparative and Example repellent fluorochemical-containing extruded articles were produced as meltblown nonwoven web materials. The meltblown Example and Comparative materials contained UNIDYNE fluoropolymer, an internal melt additive fluorochemical composition commercially available from Daikin America, Inc. of Orangeburg, N.Y. UNIDYNE fluoropolymer is a telomer-based fluoroalkyl acrylate fluorochemical. In addition, a two meltblown webs were produced without any repellency fluorochemical treatments, for "Controls" or baseline of the repellency testing.

The meltblown webs were produced by extruding a polymer composition at a melt temperature of about 540° F. (282° C.) through a meltblowing die at a throughput of about 2 pounds per inch per hour (about 36 kg/meter/hour), attenuating the fibers using primary air at a temperature of about 540° F. (282° C.), and collecting the meltblown fibers into a meltblown web on a foraminous forming surface. The meltblown webs were all about 0.5 osy (about 17 gsm) in basis weight. The majority polymer in the extruded polymer composition for the Control 1 and Comparative 1, 2 and 3 meltblown webs was 3746G polypropylene homopolymer, a meltblown grade polymer commercially available from the ExxonMobil Chemical Company of Houston, Tex. Comparative 2, besides containing a majority polypropylene homopolymer, also contained about 20 percent by weight of the random copolymer or RCP described more fully below with respect to the Example webs. Comparative 3 was produced to be substantially in accordance with the teachings of U.S. Pat. No. 5,482,765 to Bradley et al., which teaches that fluorochemical containing meltblown layers may usefully contain 5 to 20 weight percent polybutylene. Therefore, besides containing a majority of 3746G polypropylene homopolymer, Comparative 3 also contained about 10 percent by weight of a polybutylene polymer designated DP-8911 polybutylene, which is a DURAFLEX®-brand ethylene copolymer of 1-butene having about 5% ethylene and which is commercially available from Basell USA, Inc. of Wilmington, Del.

The Example meltblown webs (Examples 1, 2 and 3) each contained a majority of a random copolymer (RCP) which was a random copolymer of ethylene in propylene, containing approximately 3% ethylene monomer in the propylene. The RCP was designated X11750-49-1 and also obtained from Basell USA, Inc. The weight composition of each of the meltblown webs is shown below in TABLE 1, including weight additive of the fluorochemical composition.

TABLE 1

| Sample | 3746G | RCP | DP-8911 | UNIDYNE |
|---|---|---|---|---|
| Control 1 | 100.0% | 0% | 0.0% | 0.0% |
| Control 2 | 0% | 100% | 0.0% | 0.0% |
| Comparative 1 | 99.25% | 0% | 0.0% | 0.75% |
| Comparative 2 | 79.25% | 20% | 0.0% | 0.75% |
| Comparative 3 | 89.25% | 0% | 10.0% | 0.75% |
| Example 1 | 44.25% | 55% | 0.0% | 0.75% |
| Example 2 | 24.25% | 75% | 0.0% | 0.75% |
| Example 3 | 4.25% | 95% | 0.0% | 0.75% |

Repellency Testing:

The repellency of the meltblown nonwoven materials to low surface tension fluids was tested by determining the materials' repellency to a series of solutions of isopropyl alcohol in water. Drops of the isopropyl alcohol/water solutions were placed on the surfaces of the materials. The solutions contained isopropyl alcohol at volumetric concentrations in water of 20%, 30%, 40%, 50%, 60%, 70%, 80%, 90% and 99%. As the level of isopropyl alcohol in the solution is increased, the solution surface tension decreases and it becomes more difficult for a given material to effectively repel the solution. As a reference point, 100% isopropyl alcohol has a surface tension of about 22 dynes/cm.

To perform the test, eight drops of each isopropyl alcohol/water solution were placed along the cross machine direction of the meltblown material being tested. After five minutes, a repellency rating was given. The repellency rating number was the solution with the highest percentage isopropyl alcohol that did not wet the material surface. The back of each material was observed to determine if the material was wetted through by the isopropyl alcohol solution. If one or more of the eight drops of an isopropyl alcohol solution wetted the material, then the material was failed at that level.

In some cases, a rating between increments of 10% isopropyl alcohol was given. For example, a rating of 85% isopropyl alcohol indicates that the material easily repelled 80% isopropyl alcohol but only a drop or two of the eight drops of 90% isopropyl alcohol just slightly wetted the material. For control purposes, the non-treated baseline meltblown materials Control 1 and Control 2 (containing 100% 3746G polypropylene and 100% of the RCP, respectively) were also tested for repellency and both of these baseline materials passed at best only 20% isopropyl alcohol.

The material samples were tested for repellency just following formation into a web material ("In-process" designation in TABLE 2), following heat exposure to the just-produced samples ("Heat" designation in TABLE 2), after allowing the samples to age for various times as indicated, and after heating of aged samples. Where the samples were heated, heating took place in an oven heated to 105° C. The results of the repellency testing for the meltblown material samples is shown below in TABLE 2.

TABLE 2

| Sample | In-process | In-process + Heat[4] | 24 hours | 24 hours + Heat[4] | 1 week | 1 week + Heat[4] |
|---|---|---|---|---|---|---|
| Control 1 | 20 | 20 | 20 | 20 | 20 | 20 |
| Control 2 | 10 | 20 | 20 | 20 | 20 | 20 |
| Comparative 1 | 30 | 30 | 20 | 30 | 20 | 30 |
| Comparative 2 | 30 | 40 | 20 | 30 | 20 | 30 |
| Comparative 3 | 30 | 65 | 20 | 65 | 30 | 65 |
| Example 1 | 30 | 55 | 20 | 55 | 30 | 55 |
| Example 2 | 30 | 55 | 25 | 45 | 25 | 55 |
| Example 3 | 30 | 60 | 20 | 60 | 30 | 65 |

[4]2 minutes in oven heated at 105° C.

As can be seen from TABLE 2, the meltblown Control (untreated) materials were only positive for repellency to isopropyl alcohol at, at best, a 20% concentration in water. The comparative meltblown samples Comparative 1 and Comparative 2 demonstrated at best an increase in repellency rating, upon attempted heat-blooming or heat-migration of the treatment additive, of 10%. However, it can be seen in TABLE 2 that for the Example materials Examples 1-3, the treatment additive appears to have migrated more easily to the surface, as demonstrated by the improved response to heating versus Comparatives 1 and 2. At a minimum, the response to heat-blooming of the melt processable additive treatment for the Examples was an increase in repellency rating of 20% (Example 2 when heated after 24 hours). The remainder of the testing times for the Examples 1-3 showed a migration response correlating to an increase in repellency rating of at least 25% or more, up to a 40% increase in repellency rating, which results are very similar to the result obtained with the majority polypropylene and 10% polybutylene blend in Comparative 3.

Although the Examples relate to melt processable additive treatments which are fluoropolymer melt additives designed to increase repellency to low surface tension fluids, we believe the invention should also be applicable to melt processable additive treatments more generally, and especially melt additives which form a separate segregated moiety from the major component thermoplastic polymer in the thermoplastic polymeric composition. As described above, additive treatments exist to enhance the properties of absorbency, hydrophilicity or wettability, anti-static properties, anti-microbial and anti-fungal action, and the like.

As stated, the extruded thermoplastic articles may desirably be such as fibers useful for producing nonwoven webs and may be thermoplastic films as are known. It may also be desirable to produce laminates or composite materials of such nonwoven webs with other layers such as other nonwoven webs or with films. The individual layers of such laminates may be bonded together by methods known in the art such as mechanical entangling, hydroentangling, adhesive bonding, ultrasonic bonding, and thermal bonding methods. An exemplary bi-layer laminate material comprising the extruded articles of the invention is shown in side view in FIG. 1. As shown in FIG. 1, the bi-layer laminate material is generally designated 10 and comprises a first layer 14 and second layer 16. Either or both of the first and second layers (14, 16) may desirably comprise extruded thermoplastic articles such as the films and spunbond and meltblown fibers discussed above. Particularly useful constructions include spunbond-spunbond laminates, spunbond-film laminates and spunbond-meltblown laminates.

Figure 2:
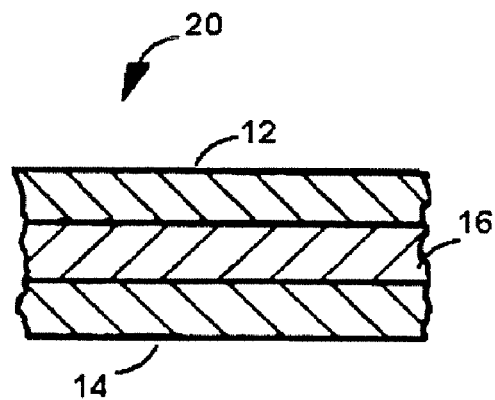
FIG. 2 is a schematic illustration of another embodiment of a protective material which may be formed utilizing the extruded thermoplastic articles of the present invention.
Figure 3:
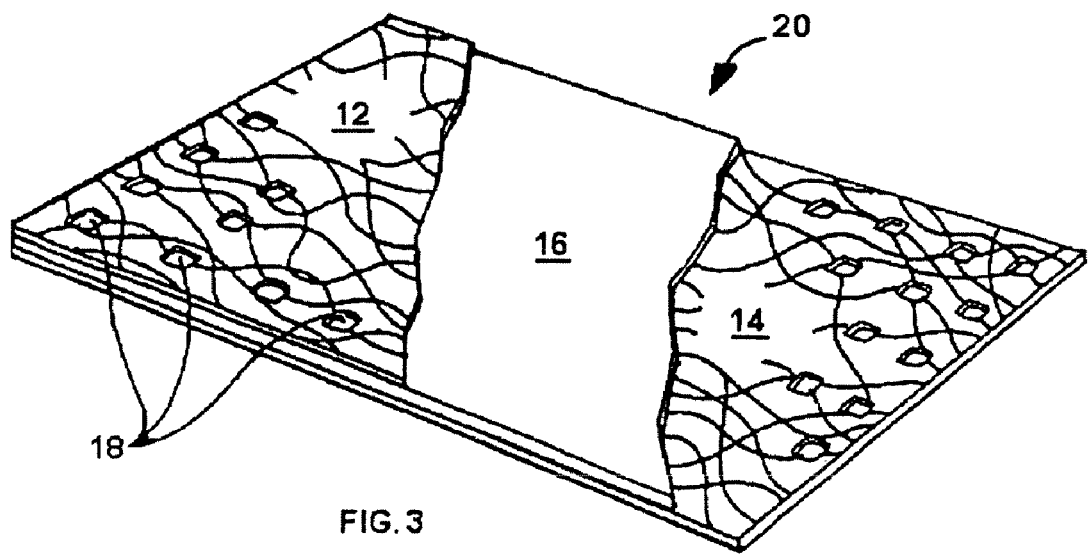
FIG. 3 is a partially cut-away perspective view of the embodiment of the protective material shown in FIG. 2.

FIG. 2 and FIG. 3 illustrate exemplary tri-layer laminate materials which may desirably be constructed using the extruded thermoplastic articles of the invention. In FIG. 2 the tri-layer laminate material, generally designated 20, is shown in a cross sectional side view and comprises first outer layer 12 and second outer layer 14 with inner layer 16 sandwiched therebetween. FIG. 3 illustrates a tri-layer laminate shown in a partially cut-away view showing inner layer 16 sandwiched between outer layers 12 and 14. As shown in FIG. 3, the outer layers 12 and 14 are fibrous layers such as spunbond or meltblown fibrous layers. Additionally shown in FIG. 3 are exemplary bond points 18 such as may be made by a thermal point bonding process. Any of the first and second outer layers or the inner layer as are shown in FIG. 2 or FIG. 3 may desirably comprise extruded thermoplastic articles such as the films and spunbond and meltblown fibers discussed above.

An example of a multilayer laminate material comprising one or more meltblown fiber web layers and spunbond fiber web layers is an embodiment such as a spunbond-meltblown-spunbond (SMS) laminate as disclosed in U.S. Pat. No. 4,041,203 to Brock et al., U.S. Pat. No. 5,169,706 to Collier, et al. and U.S. Pat. No. 4,374,888 to Bornslaeger, all incorporated herein by reference in their entireties. Such a SMS laminate may be made by sequentially depositing onto a moving forming belt first a spunbond fiber nonwoven web layer, then one or more meltblown fiber web layers followed by another spunbond fiber layer, and then bonding the laminate together by thermal point bonding, adhesive bonding or ultrasonic bonding or by other means as known in the art.

Figure 4:
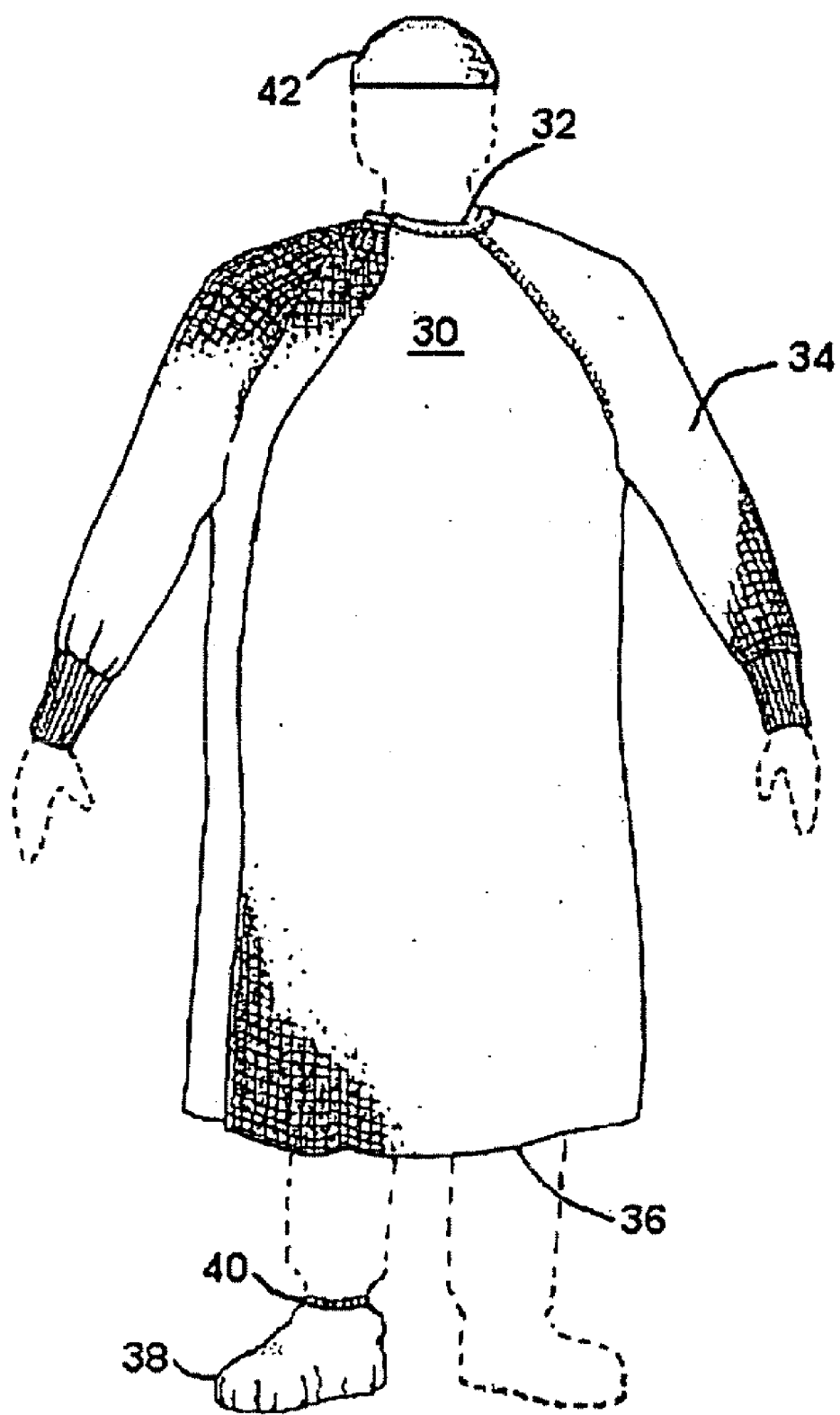
FIG. 4 is a schematic illustration of various medical products fabricated utilizing materials formed from the extruded thermoplastic articles of the present invention.

The extruded articles and multicomponent extruded thermoplastic articles of the invention are highly suitable for various uses, for example, uses including infant, child and adult personal care absorbent products, disposable protective articles such as protective fabrics, fabrics for medical products such as patient gowns, sterilization wraps and surgical drapes, gowns, head and shoe coverings, and fabrics for other protective garments. Exemplary medical products are shown schematically in FIG. 4 on a human outline represented by dashed lines. As illustrated in FIG. 4, gown 30 is a loose fitting garment including neck opening 32, sleeves 34, and bottom opening 36. Gown 30 may be fabricated using films and/or nonwoven webs or laminates comprising the extruded articles of the invention. Also shown on the human outline in FIG. 4 is shoe covering 38 having opening 40 which allows the cover to fit over the foot and/or shoe of a wearer. Shoe covering 38 may be fabricated using films and/or nonwoven webs or laminates comprising the extruded articles of the invention. Additionally shown in FIG. 4 is head covering 42, such as a surgical cap, which may be fabricated using films and/or nonwoven webs or laminates comprising the extruded articles of the invention.

Various additional finishes, additives, and/or potential processing steps known in the art may be performed on the extruded articles or upon web or film materials comprising such extruded articles without departing from the spirit and scope of the invention. Examples include such as aperturing, slitting, stretching, treating, or lamination with films or other nonwoven layers. An example of a web finishing treatment is electret treatment to induce a permanent electrostatic charge in the web. In addition, treatment to provide antistatic properties to extruded articles or to nonwoven webs or films made therefrom may be desirable. Antistatic treatments may be applied topically by spraying, dipping, etc., and an exemplary topical antistatic treatment is a 50% solution of potassium N-butyl phosphate available from the Stepan Company of Northfield, Ill.

under the trade name ZELEC. Another exemplary topical antistatic treatment is a 50% solution of potassium isobutyl phosphate available from Manufacturer's Chemical, LP, of Cleveland, Tenn. under the trade name QUADRASTAT. As another example, treatments to induce or increase hydrophilicity may also be applied topically, such as by dipping or by spraying of surfactant or other compositions such as are known in the art.

While various patents have been incorporated herein by reference, to the extent there is any inconsistency between incorporated material and that of this written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A film comprising a core layer formed from a thermoplastic polymer composition, wherein the thermoplastic polymer composition comprises a polyolefin copolymer, propylene homopolymer, and fluorochemical, wherein polyolefin copolymers constitute about 50 wt. % or more of the polymer content of the composition, polypropylene homopolymers constitute from 0 wt. % to about 50 wt. % of the polymer content of the composition, and fluorochemicals constitute from 0 wt. % to about 5 wt. % of the polymer content of the composition, wherein propylene constitutes from about 90 wt. % to about 99.5 wt. % of the polyolefin copolymer.

2. The film of claim 1, wherein the fluorochemical is co-extruded with the polyolefin copolymer, propylene homopolymer, or both.

3. The film of claim 1, wherein the fluorochemical is a telomer-based fluoroalkyl acrylate fluoropolymer.

4. The film of claim 3, wherein the telomer-based fluoroalkyl acrylate fluoropolymer comprises a majority of perfluorooctane groups.

5. The film of claim 1, wherein fluorochemicals constitute from about 0.1 wt. % to about 4 wt. % of the polymer content of the composition.

6. The film of claim 1, wherein fluorochemicals constitute from about 0.25 wt. % to about 2.5 wt. % of the polymer content of the composition.

7. The film of claim 1, wherein the film also contains a skin layer.

8. The film of claim 1, wherein polyolefin copolymers constitute from about 60 wt. % to about 98 wt. % of the polymer content of the composition.

9. The film of claim 1, wherein polyolefin copolymers constitute from about 80 wt. % to about 98 wt. % of the polymer content of the composition.

10. The film of claim 1, wherein propylene constitutes from about 95 wt. % to about 99 wt. % of the copolymer.

11. The film of claim 1, wherein the copolymer is a copolymer of propylene and a $C_2$-$C_{20}$ α-olefin.

12. The film of claim 11, wherein the α-olefin is ethylene.

13. The film of claim 11, wherein the α-olefin constitutes from about 1 wt. % to about 5 wt. % of the copolymer.

14. The film of claim 1, wherein the polyolefin copolymer is a random copolymer.

15. The film of claim 1, wherein polypropylene homopolymers constitute from 0 wt. % to about 25 wt. % of the composition.

16. The film of claim 1, wherein the film is microporous.

17. A nonwoven laminate comprising:
a nonwoven web; and
a film attached to the nonwoven web, the film comprising a core layer formed from a thermoplastic polymer composition, wherein the thermoplastic polymer composition comprises a polyolefin copolymer, propylene homopolymer, and melt processable additive, wherein the polyolefin copolymer constitutes about 50 wt. % or more of the polymer content of the composition, the polypropylene homopolymer constitutes from 0 wt. % to about 50 wt. % of the polymer content of the composition, and the melt processable additive constitutes from 0 wt. % to about 5 wt. % of the polymer content of the film, wherein propylene constitutes from about 90% by weight to about 99.5% by weight of the polyolefin copolymer.

* * * * *